(12) United States Patent
Uematsu et al.

(10) Patent No.: US 7,114,915 B2
(45) Date of Patent: Oct. 3, 2006

(54) GAS TURBINE AND TURBINE ROTOR FOR A GAS TURBINE

(75) Inventors: Kazuo Uematsu, Hyogo-ken (JP); Kazuharu Hirokawa, Hyogo-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 80 days.

(21) Appl. No.: 10/339,293

(22) Filed: Jan. 10, 2003

(65) Prior Publication Data

US 2003/0133786 A1  Jul. 17, 2003

(30) Foreign Application Priority Data

Jan. 11, 2002 (JP) .............................. 2005-005031

(51) Int. Cl.
*F01D 5/08* (2006.01)

(52) U.S. Cl. ..................................... 415/115; 416/96 R (58) Field of Classification Search ................ 415/114, 415/115, 116, 117; 416/95, 96 R See application file for complete search history.

(56) References Cited

U.S. PATENT DOCUMENTS 4,880,354 A * 11/1989 Teranishi et al. ............. 416/95
5,525,032 A * 6/1996 Kreis et al. ..................... 415/1
5,755,556 A * 5/1998 Hultgren et al. .......... 416/96 R
6,053,701 A    4/2000 Ichiryu et al. ................ 416/96
6,065,282 A * 5/2000 Fukue et al. ................. 415/115
6,094,905 A * 8/2000 Fukuyama .................... 415/115

FOREIGN PATENT DOCUMENTS

JP    10-205302    8/1998

* cited by examiner

*Primary Examiner*—Richard A. Edgar
(74) *Attorney, Agent, or Firm*—Oblon, Spivak, McClelland, Maier & Neustadt, P.C.

(57) ABSTRACT

A refrigerant supplied from a refrigerant supply pipe flows into a first space, being a passage of the refrigerant, from a space between first stage and second stage rotor disks. The refrigerant supplied to the first space is guided to second, third and forth spaces through a gap between a spindle bolt and a bolt hole, during which the rotor disks are warmed up or cooled. In the second stage rotor disk, a refrigerant through hole axially penetrating this rotor disk is provided near the center thereof. The refrigerant flowing into the first space passes through the refrigerant through hole to flow into the second space, to thereby promote the convection in the first, second, third and fourth spaces and equalization of temperatures in the rotor disks.

5 Claims, 8 Drawing Sheets

GAS TURBINE AND TURBINE ROTOR FOR A GAS TURBINE

BACKGROUND OF THE INVENTION

1. Field of the Invention

The present invention relates to a gas turbine and a turbine rotor that uses vapor as a refrigerant for heating components.

2. Description of the Related Art

A technique for cooling heating components, such as a rotor blade, a rotor disk, or a stator blade in a gas turbine, by using vapor instead of air as a refrigerant, is now being used, in order to increase the thermal efficiency in the gas turbine. This is due to the following reasons. The specific heat at constant pressure of dry vapor is cp=1.86 kJ/kgK under a normal condition, which is a value almost twice as large as the specific heat at constant pressure of the air, wherein cp=1.00 kJ/kgK. Therefore, vapor has a large heat capacity and a high endothermic effect as compared with air of the same mass. Hence, when vapor is used as the refrigerant, the cooling efficiency can be increased as compared when using air, and the turbine inlet temperature of the combustion gas can be increased, thereby permitting an improvement in thermal efficiency.

In conventional air cooling, air from a compressor is used as a refrigerant for the rotor and stator blades of the turbine. However, when this compressed air is used for cooling, the work that can be obtained from the turbine decreases. If vapor is used instead of the air, the cooling air for the rotor and stator blades can be saved, and hence the work which can be recovered by the turbine increases by this amount, such that the work that can be obtained from the turbine can be increased.

Figure 11:
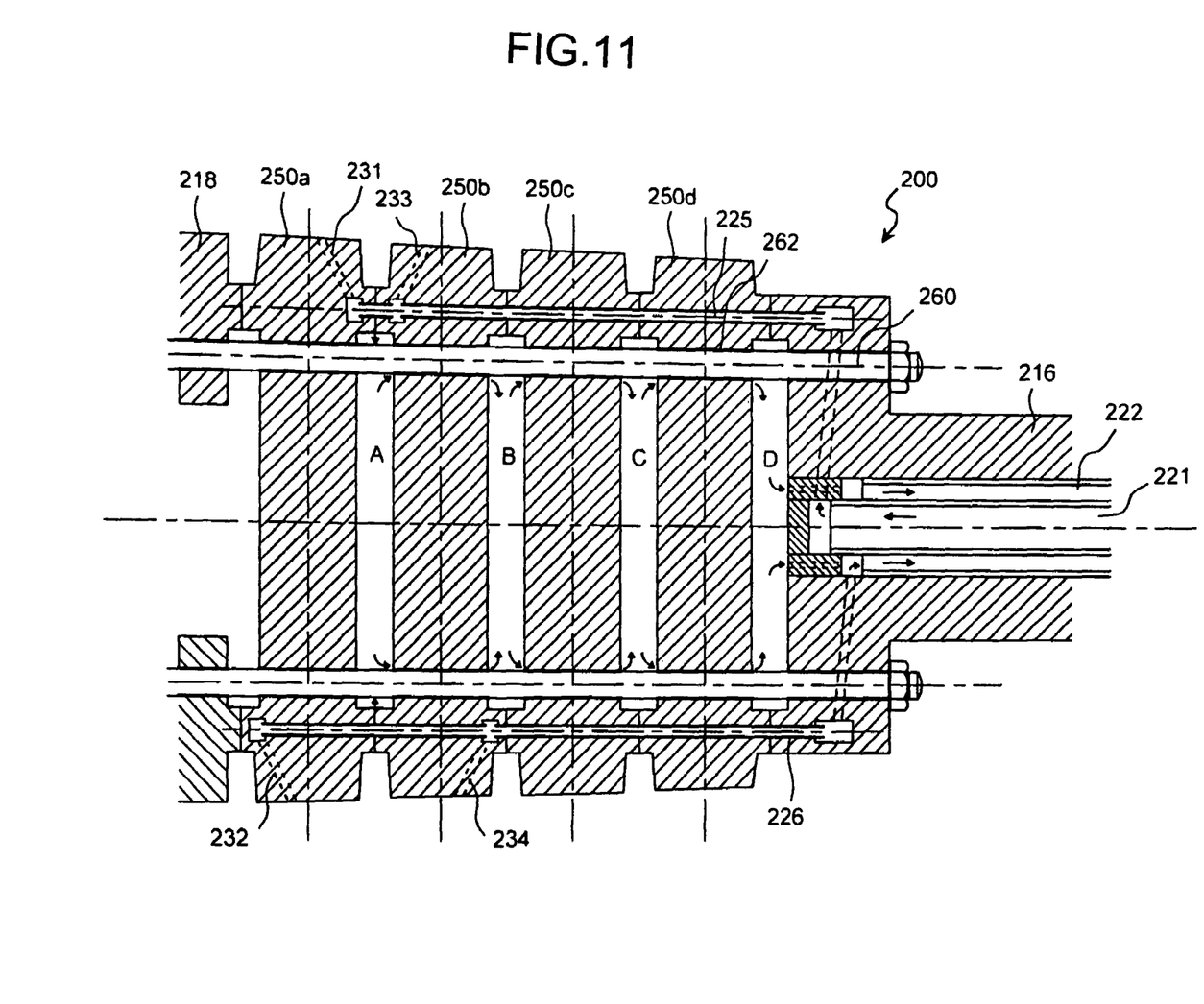
FIG. 11 is a cross section that shows a turbine rotor in a conventional gas turbine.

FIG. 11 is a cross section view that shows a turbine rotor in a conventional gas turbine. In the gas turbine using vapor cooling, for a period of time after starting the gas turbine, the turbine rotor and stator blades and a rotor disk 250a are warmed up or cooled by the compressed air generated by the compressor. This is because a certain period of time is required from the start-up of the gas turbine, in order to generate vapor sufficient for cooling these turbine rotor and stator blades and the rotor disk 250a by a heat recovery vapor generator (HRSG), using the exhaust gas from the gas turbine. When sufficient vapor is generated, the refrigerant is changed from the compressed air to the vapor.

The refrigerant for rotor disks 250a to 250d flows in such a manner that the refrigerant from a refrigerant supply pipe 225 for cooling the turbine rotor blade flows into a space between the rotor disks 250a and 250b, and then flows to spaces B, C, and D through a gap between a spindle bolt 260 and a bolt hole 262, to warm up or cool the rotor disks 250a to 250d. However, there is little convection of the refrigerant in spaces A to D, and hence time is required to warm up or cool the rotor disks 250a to 250d, thereby causing a problem in that the start-up of the gas turbine is delayed.

Further, the refrigerant flows from between the spindle bolt 260 and the bolt hole 262 in spaces A to D, but since the convection of the refrigerant in spaces A to D is of a small amount, the temperature only changes in the vicinity thereof, and the temperature change is slow. Therefore, a radial temperature distribution occurs in the rotor disks 250a to 250d. This transitional temperature distribution is not always uniform with respect to the circumferential direction, so as to cause temperature nonuniformity, and hence a thermal bend occurs in the turbine rotor 200. As a result, there is the possibility that the spindle vibrations of the rotor increase, to cause a trip (stoppage) of the gas turbine.

SUMMARY OF THE INVENTION

It is an object of the present invention to solve at least the above mentioned problems.

The turbine rotor in a gas turbine according to the present invention has a plurality of stages of rotor disks; a spindle coupled to the rotor disks by a plurality of spindle bolts; and a space formed between the rotor disks and inside the spindle into which a refrigerant is circulated. Moreover, at least one through hole that is substantially parallel to the spindle bolts and through which the refrigerant can pass is provided in at least one rotor disk of the rotor disks after a second stage.

The through hole may provided, for example, in each alternate rotor disk of the rotor disks after the second stage or it may be provided, for example, in two adjacent rotor disks. Moreover, the through hole may be provided at substantially a center portion of the rotor disk or a plurality of through holes may be provided around a center portion of the rotor disk.

The gas turbine according to the present invention employs the turbine rotor according to the present invention.

These and other objects, features and advantages of the present invention are specifically set forth in or will become apparent from the following detailed descriptions of the invention when read in conjunction with the accompanying drawings.

DESCRIPTION OF THE PREFERRED EMBODIMENTS

Exemplary embodiments of the gas turbine and the turbine rotor according to the present invention are explained in detail below with reference to the drawings, but the present invention is not limited by these embodiments. The components in the embodiments include one that can be assumed easily by those skilled in the art, or substantially the same one.

Figure 1:
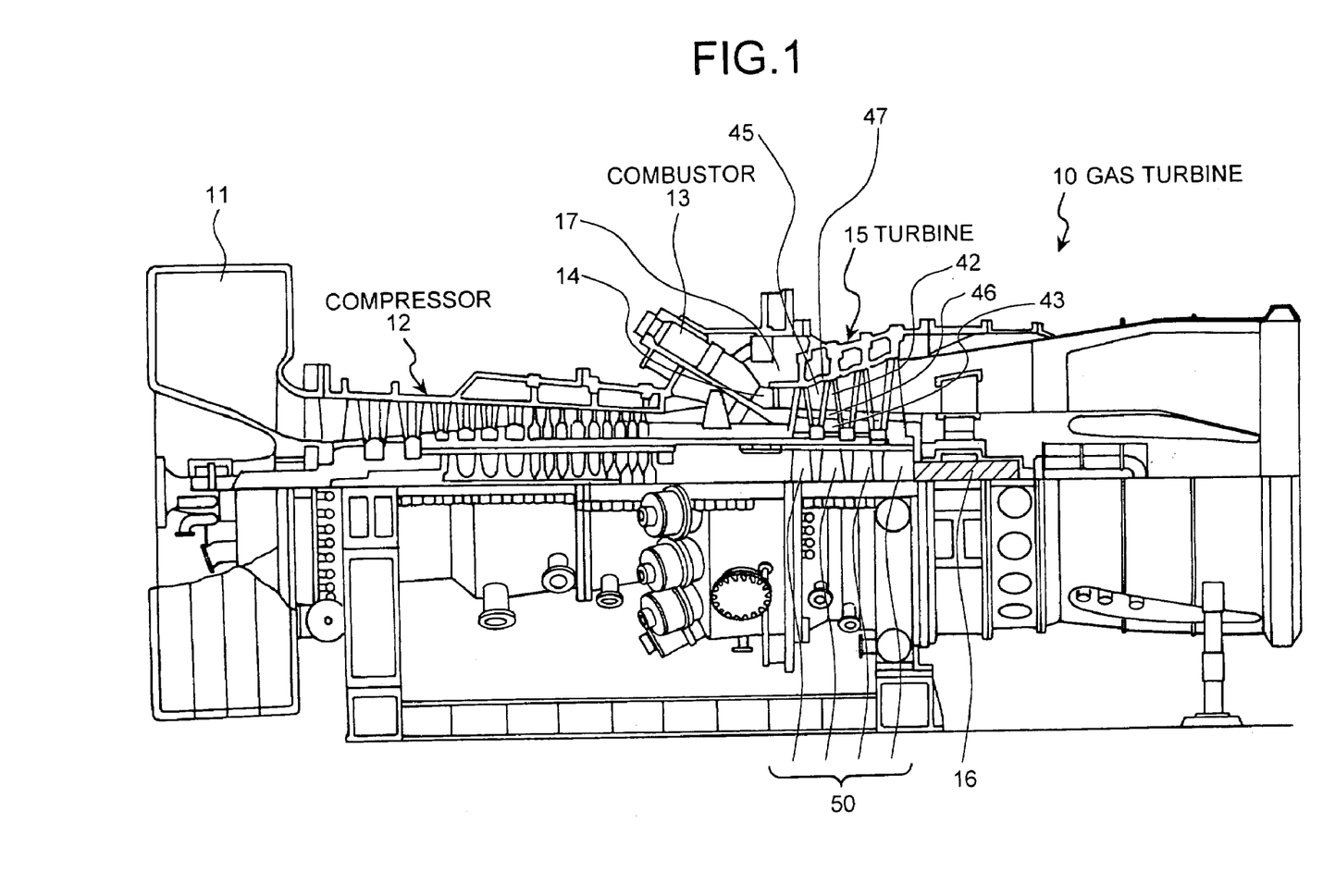
FIG. 1 shows a gas turbine according to a first embodiment of the present invention.

FIG. 1 shows a gas turbine according to a first embodiment of the present invention. The gas turbine 10 is of a type in which heating components of the gas turbine 10, such as a rotor blade, a rotor disk, or a stator blade is cooled by vapor. The air taken in from an air intake 11 is compressed by a compressor 12, to become high temperature and high pressure compressed air, and is fed to a combustor 13. The combustor 13 supplies a gas fuel such as natural gas or the like, or a liquid fuel such as gas oil, light fuel oil or the like to the compressed air, to burn the fuel, to thereby generate high temperature and high pressure combustion gas. This high temperature and high pressure combustion gas is guided to a combustor tail pipe 14, and injected into a turbine 15.

The stator blade and the rotor blade on the upper stage of the turbine 15 are cooled by the vapor, and the vapor for cooling the rotor blade is supplied and recovered through a coaxial vapor supply and recovery flow passage provided in the turbine main spindle 16. This vapor supply and recovery flow passage changes direction by 90 degrees in the turbine main spindle 16, passes through a plurality of external refrigerant passages 25 and 26 provided in the circumferential direction of the rotor disk 50, and is supplied to or recovered from the rotor blade. The rotor disks 50 are fixed by a plurality of spindle bolts axially penetrating the rotor disks 50, and constitute a rotating cascade of a plurality of stages.

Figure 2:
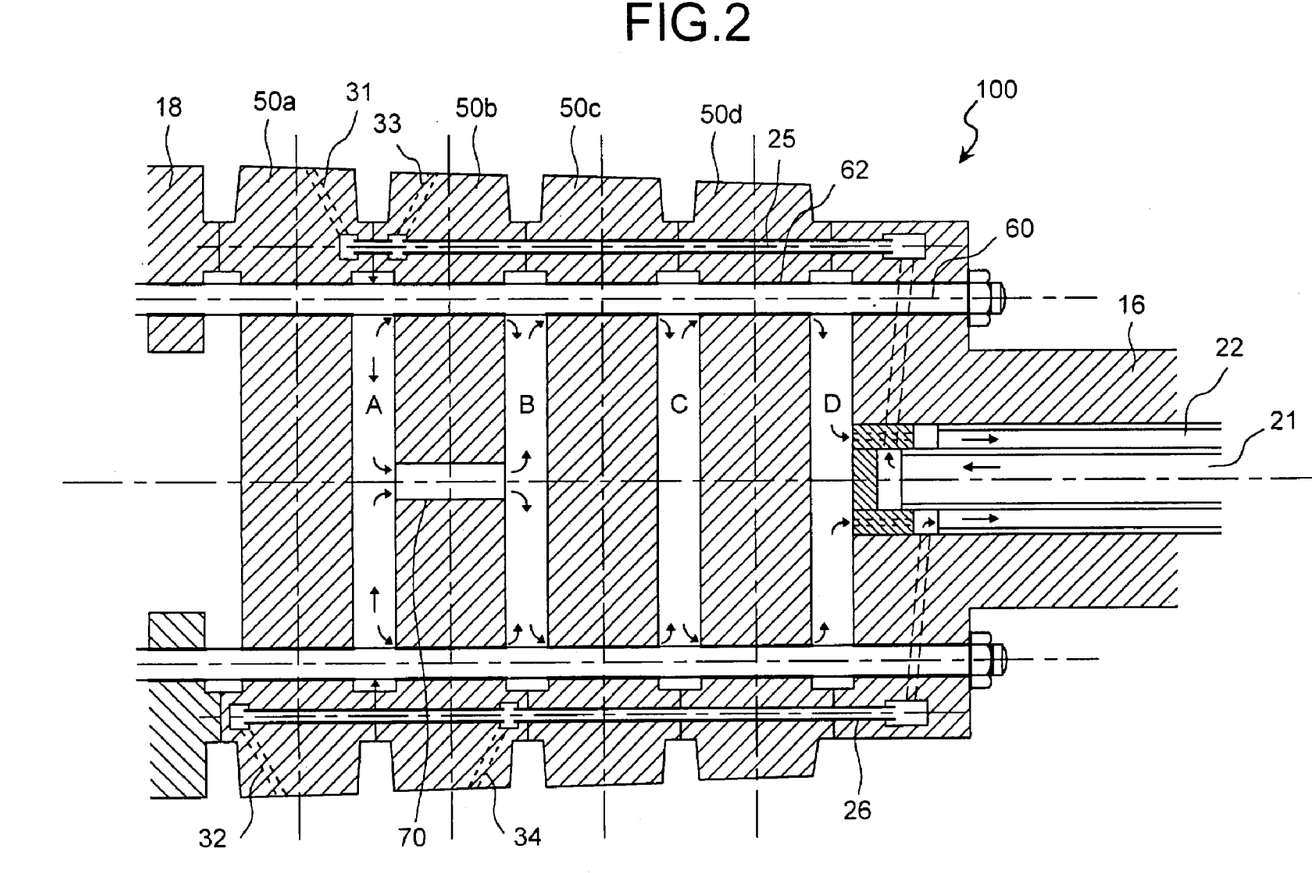
FIG. 2 shows a turbine rotor according to the first embodiment.

FIG. 2 shows a turbine rotor according to the first embodiment. The turbine rotor 100 has a refrigerant through hole 70 axially penetrating a rotor disk 50b on the second stage and which is provided at the center of the rotor disk 50b. Four rotor disks 50a to 50d are positioned between a compressor connecting member 18 and the turbine main spindle 16, and fastened by a spindle bolt 60, to thereby constitute the turbine rotor 100.

In spaces A to D, being passages for the refrigerant enclosed by the rotor disks, vapor from a refrigerant supply pipe 25 for cooling the rotor blades flows into the space A, and is recovered in the space D to a refrigerant return passage 22 in the turbine main spindle 16. As the refrigerant, casing air from a gas turbine casing 17 (see FIG. 1) or vapor generated by an exhaust gas boiler of the gas turbine is supplied. The casing air is used for warming up or cooling the rotor disks 50a to 50d, the turbine main spindle 16 and the rotor blade (not shown), at the time of start-up of the gas turbine. After warning up has finished, the refrigerant is changed from the casing air to the vapor, and the gas turbine 25 shifts to the rated operation.

The refrigerant supplied from the refrigerant supply pipe 25 and flowing into the space A passes through a gap between the spindle bolt 60 and the bolt hole 62 and is guided to space B, space C and space D. The vapor flowing into space D flows into the refrigerant return passage 22 and is recovered.

The refrigerant through hole 70, being a through hole axially penetrating the rotor disk 50b, is provided in the second stage rotor disk 50b near the center thereof. The refrigerant flowing into the space A not only flows into the gap between the spindle bolt 60 and the bolt hole 62, but also passes through the refrigerant through hole 70 to flow into the space B. In the conventional turbine rotor 200, as shown in FIG. 11, the refrigerant passes through only the gap between the spindle bolt 260 and the bolt hole 262 to flow into the space B. As a result, in space A and space B, the refrigerant flows radially outwards. Therefore, in the conventional turbine rotor 200, the radially inside of the rotor disks 250a and 250b are hard to be warmed up or cooled, thereby causing a radial temperature distribution in the rotor disks 250a and 250b. As a result, there is a possibility that spindle vibrations occur resulting from the temperature distribution, to cause a problem in the operation of the gas turbine.

In the turbine rotor 100 of this gas turbine, however, the refrigerant passes through the refrigerant through hole 70 provided near the center of the second stage rotor disk 50b, and the refrigerant having passed through this shifts radially outward of the space B. Therefore, the refrigerant flows throughout space A and space B, and hence the entirety of the rotor disks 50a to 50c are uniformly warmed up and cooled. Thereby, the temperature distribution in the rotor disks 50a to 50c becomes uniform on the radially outside and inside. As a result, vibrations as in the conventional gas turbine and shakiness of the refrigerant supply and return pipes 25 and 26 hardly occur, thereby enabling stable operation of the gas turbine.

Further, since the thermal stress resulting from the temperature difference between the outer circumference and the inner circumference of the rotor disks 50a to 50c can be reduced, deformation of the rotor disks 50a to 50c can be suppressed. The gas turbine repeats start-up and shut down, thereby making the rotor disks 50a to 50c repetitively undergo thermal stress. Therefore, the rotor disks 50a to 50c become fatigued. However, since the generated thermal stress itself can be decreased, the degree of fatigue can be decreased. As a result, the life of the rotor disks 50a to 50c can be extended.

Figure 3:
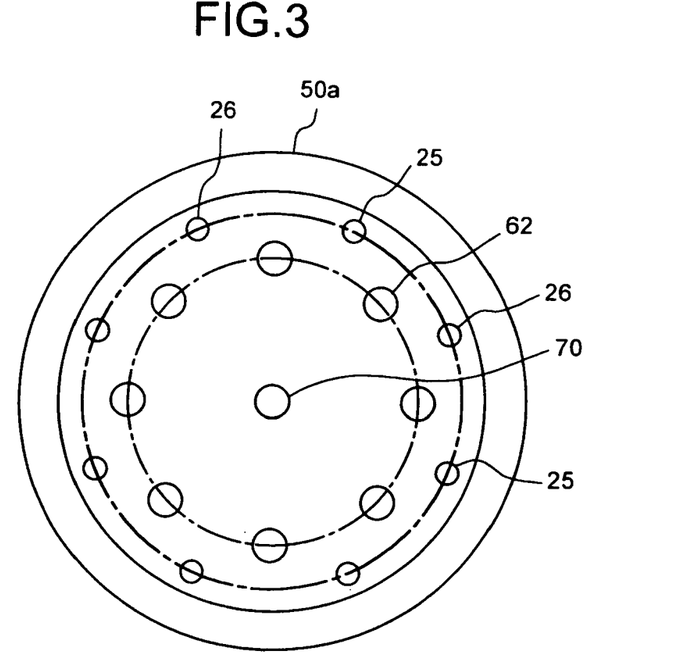
FIG. 3 is a front view of a first rotor disk having a refrigerant through hole.
Figure 4:
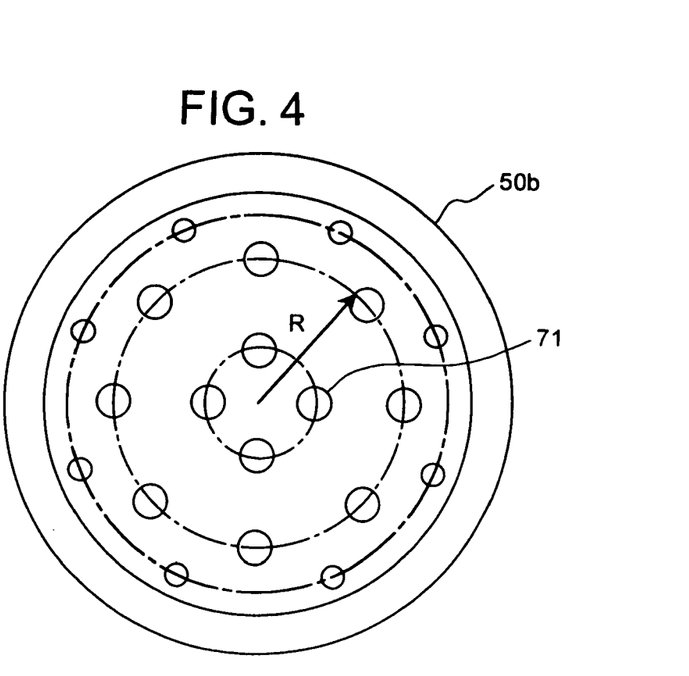
FIG. 4 is a front view of a second rotor disk having a refrigerant through hole.

FIGS. 3 and 4 are front views of a rotor disks having the refrigerant through hole. As shown in FIG. 3, in the first embodiment, the refrigerant through hole 70 is provided at the center of the rotor disk 50b. Since the refrigerant through hole 70 is provided at the center of the rotor disk 50b, convection of the refrigerant in the space formed between the rotor disks can be promoted.

As shown in FIG. 4, many refrigerant through holes 71 may be provided at a certain interval (angle) with respect to the circumferential direction of the rotor disk 50b. Also in this manner, the temperature of the rotor disk 50b and the like can be equalized, and the thermal stress generated in the rotor disk can be reduced. As a result, the life of the rotor disks 50a to 50c can be extended. Further, vibrations of the rotor system are reduced more than before, thereby enabling stable operation. The refrigerant through holes 71 can obtain sufficient convection promoting action, if being provided two or more. However, it is preferable to provide at least four, in order to circulate the refrigerant more efficiently. In this case, it is preferable to provide the refrigerant through holes 71 at an equal interval (angle) in the circumferential direction, in order to suppress the temperature distribution in the circumferential direction.

The refrigerant through holes 71 are provided near the center of the rotor disk 50b, but it is preferable to arrange the refrigerant through holes 71 at a distance within R/2 from the center of the rotor disk 50b, from the viewpoint of promoting the convection of the refrigerant. R is a distance from the center of the rotor disk 50b to the center of the bolt hole 62. When it is desired to suppress the temperature distribution in the rotor disk 50b and the like, it is desired to arrange the refrigerant through holes 71 at a distance within R/3 from the center of the rotor disk 50b.

Figure 5:
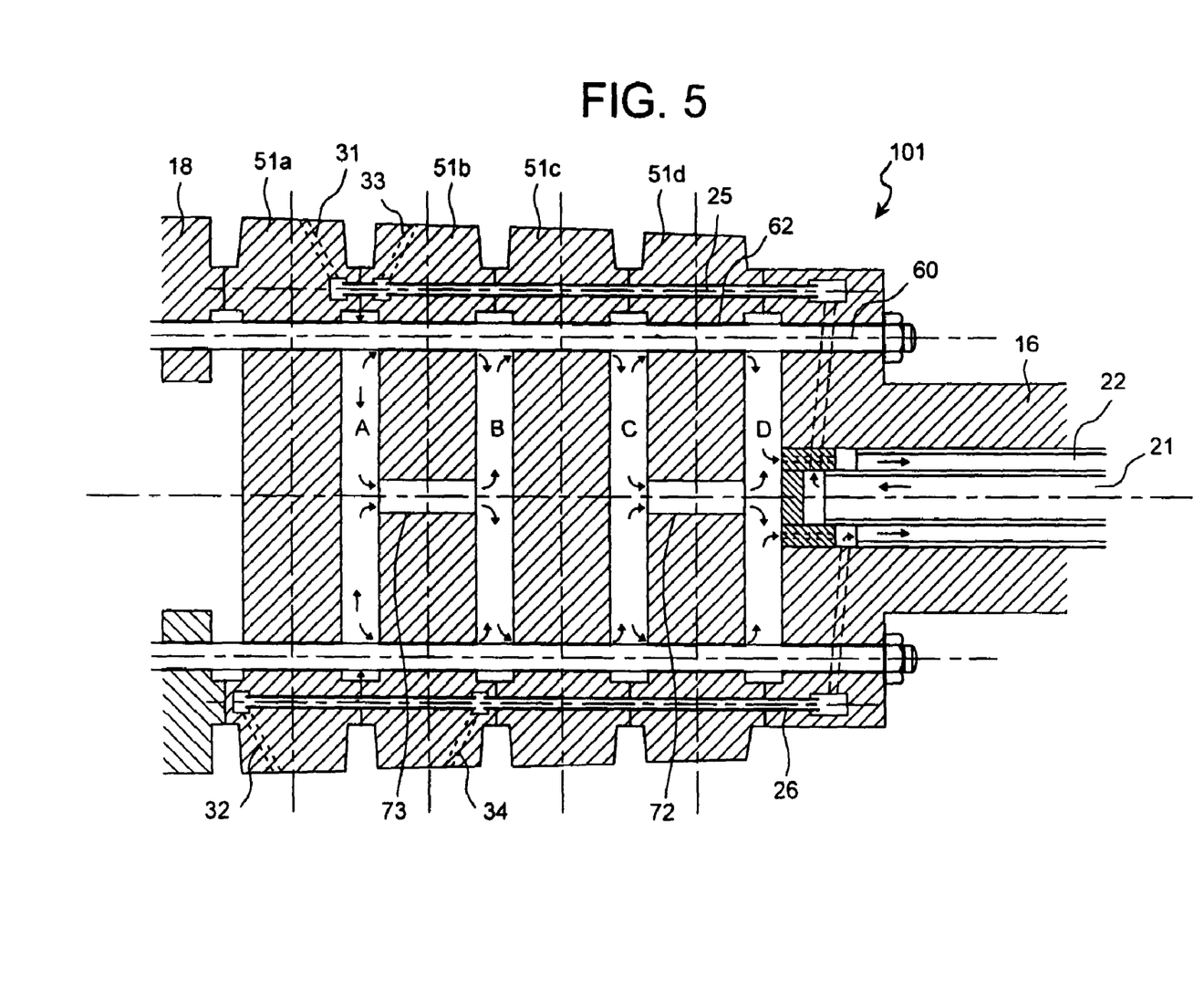
FIG. 5 shows a modified example of the turbine rotor according to the first embodiment.

FIG. 5 shows a modification of the turbine rotor according to the first embodiment. This turbine rotor 101 comprises a refrigerant through hole 72 provided in the fourth stage rotor disk 51d, axially penetrating the rotor disk 51d. In this manner, the convection of the refrigerant is promoted also in the space C, and hence the temperature distribution in the rotor disks 51c and 51d can be made uniform. As a result, the occurrence of vibrations can be further suppressed, which is desirable. Further, since the thermal stress occurring in the rotor disks 51c and 51d can be decreased by equalizing the temperature distribution in the rotor disks 51c and 51d, and hence it is more preferable.

In this turbine rotor 101, the refrigerant flowing from the refrigerant supply pipe 25 to the space A passes through a refrigerant through hole 73 provided in the rotor disk 51b, and flows from space A to the space B. Part of the refrigerant flows from the vicinity of the center of the rotor disk radially outwardly, and flows into the next space B through the gap between the spindle bolt 60 and the bolt hole 62. The refrigerant flowing from the refrigerant through hole 73 to the space B flows in the space B radially outwardly of the rotor disks 50b and 50c. Thereafter, the refrigerant flows into the space C through the gap between the spindle bolt 60 and the bolt hole 62, and in this space C, again flows from the outside of the rotor disks 51c and 51d towards the vicinity of the center portion thereof. The refrigerant flowing into the space C flows from the refrigerant through hole 72 provided in the rotor disk 51d to the space D, and then flows outwards from the vicinity of the center of the space D. In this manner, the refrigerant flows radially all over the rotor disks 51a to 51d to promote convection, to thereby reduce the temperature distribution in the radial direction of the rotor disks 51a to 51d.

Figure 6:
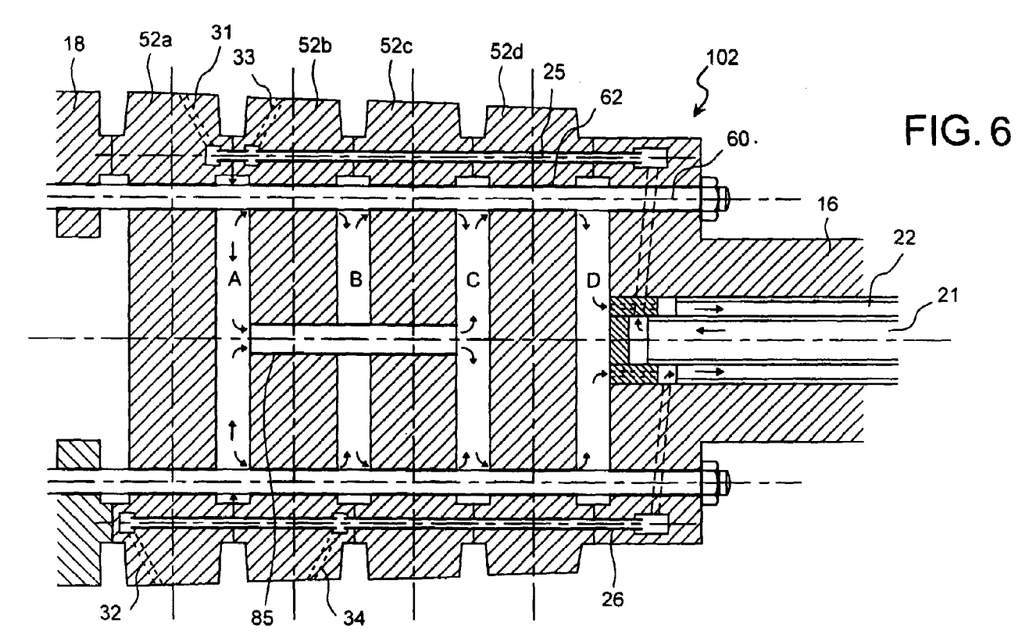
FIG. 6 is a cross sectional view of a turbine rotor according to a second embodiment of the present invention.
Figure 7:
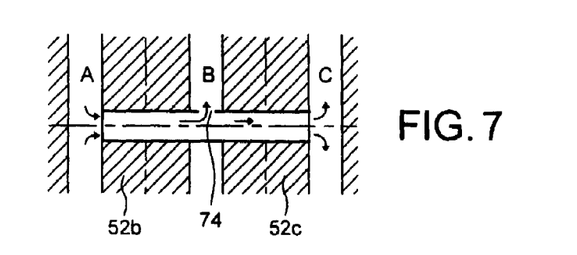
FIG. 7 is a cross sectional view of a connecting pipe with a bypass hole.

FIGS. 6 and 7 are cross sectional views of a turbine rotor 102 according to a second embodiment of the present invention. In the turbine rotor 102, a connecting pipe is arranged at the center of the rotor disk, to thereby guide the refrigerant on the high-pressure side to a refrigerant passage on the low-pressure side. The second stage rotor disk 52b and the third stage rotor disk 52c respectively comprise an opening for inserting a pipe therein at the center thereof. A connecting pipe 85 for connecting the second stage rotor disk 52b and the third stage rotor disk 52c is inserted into the opening provided in these disks 52b and 52c.

Figure 9:
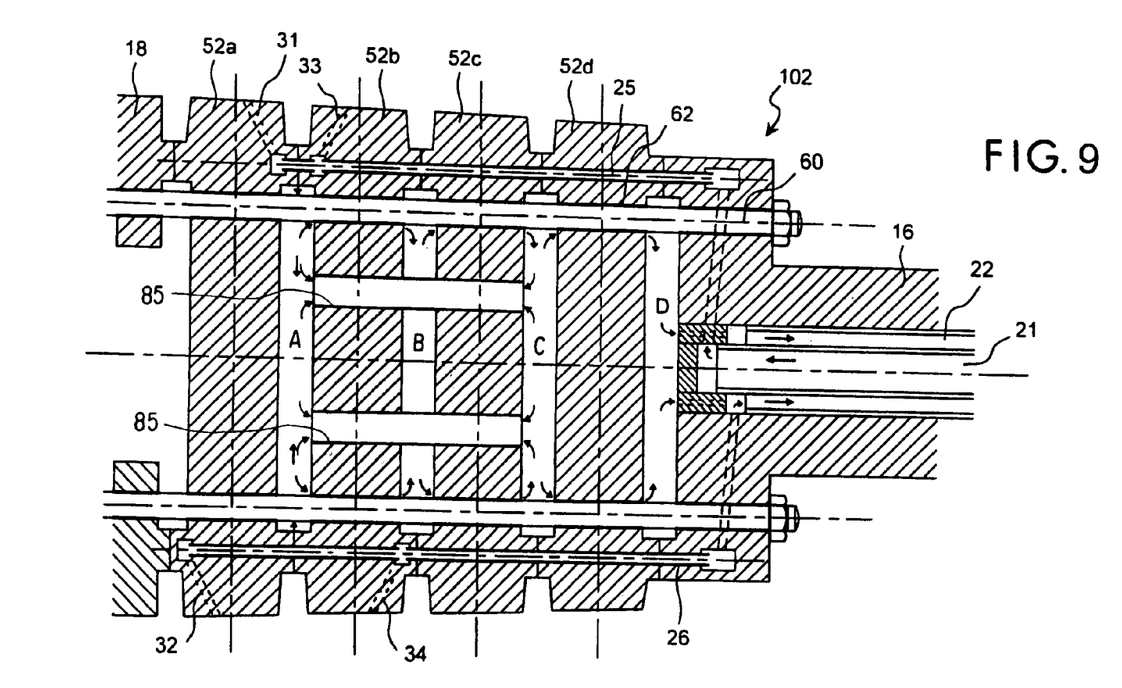
FIG. 9 is a cross sectional view of a first turbine rotor according to an alternate configuration of the second embodiment of the present invention.
Figure 10:
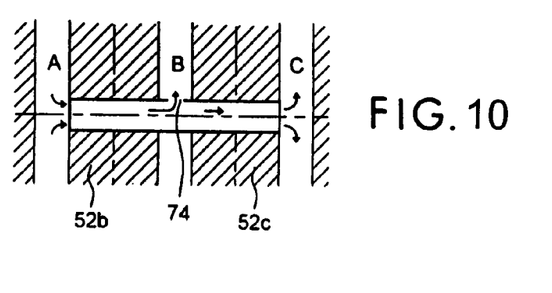
FIG. 10 is a cross sectional view of a connecting pipe with a bypass hole.

FIGS. 9 and 10 are cross sectional views of a turbine rotor 102 according to an alternate configuration of the second embodiment of the present invention. In the turbine rotor 102, connecting pipes 85 are arranged in through holes located in each of the second stage rotor disk 52b and the third stage rotor disk 52c. The through holes are located on a circumference of a circle whose center is the center of each respective rotor disk. The connecting pipes 85 guide the refrigerant on the high-pressure side to a refrigerant passage on the low-pressure side.

The refrigerant guided to the space A flows into the space C through the connecting pipe 85, and after flowing radially outwards of the rotor disk 52c in the space C, flows into the space D through the gap between the spindle volt 60 and the bolt hole 62, and is recovered through the refrigerant return passage 22. In this manner, since the refrigerant can be supplied from the vicinity of the center of the rotor disk than in the rotor disk shown in FIG. 4, the radial temperature distribution can be equalized further than in this rotor disk.

Further, since the refrigerant is supplied by the connecting pipe 85, the pressure loss can be decreased as compared with the case in which the refrigerant through holes 71 are provided in the rotor disk (see FIG. 4). Further, since the refrigerant is made to flow from the space A to the space C, a large pressure difference is made possible, as compared with the turbine rotor 100 and the like according to the first embodiment. Since sufficient refrigerant can be supplied to the space A, convection of the refrigerant in this space can be further promoted than in the turbine rotor 100 and the like according to the first embodiment. As a result, the temperature distribution in the rotor disk 52a and the like can be further equalized, to suppress vibrations of the rotor system, thereby permitting a more stable operation of the gas turbine.

In the turbine rotor 102, since the convection promoting effect of the refrigerant is high, the time required for equalizing the temperature distribution in the rotor disk 52a and the like can be decreased. As a result, the time required for reaching the rated operation from the start-up of the gas turbine can be further reduced, to thereby reduce the starting loss. Further, the time required for equalizing the temperature distribution in the rotor disk 52a and the like can be further reduced, to thus shorten the time during which the rotor disk 52a and the like undergo a large thermal stress. The burden on the rotor disk 52a and the like is reduced by this action, thereby enabling extension of the life of the rotor disk 52a and the like.

As shown in FIGS. 7 and 10, a bypass hole 74 for allowing the refrigerant to bypass may be provided at a position of the connecting pipe 85 corresponding to the space B, to thus allow the refrigerant to bypass to the space B via this bypass hole 74. When the space A and the space D are connected by the connecting pipe, a hole for supplying the refrigerant may be provided also at the position of the connecting pipe corresponding to the space C. In this manner, a sufficient amount of refrigerant can be supplied from the center of the rotor disk 52c and the like to the space B. Thereby, the convection of the refrigerant in the space B and the like can be promoted, to quickly equalize the temperature of the rotor disks 52b and 52c. As a result, the starting loss can be reduced, thereby enabling stable operation without causing tripping of the gas turbine. In this case, it is desirable because it becomes possible to supply the refrigerant uniformly to the spaces A to C, and change the amount of the refrigerant to be supplied to each space, by appropriately selecting the number and the size of the bypass hole 74 provided at the position corresponding to the space B and the like.

Figure 8:
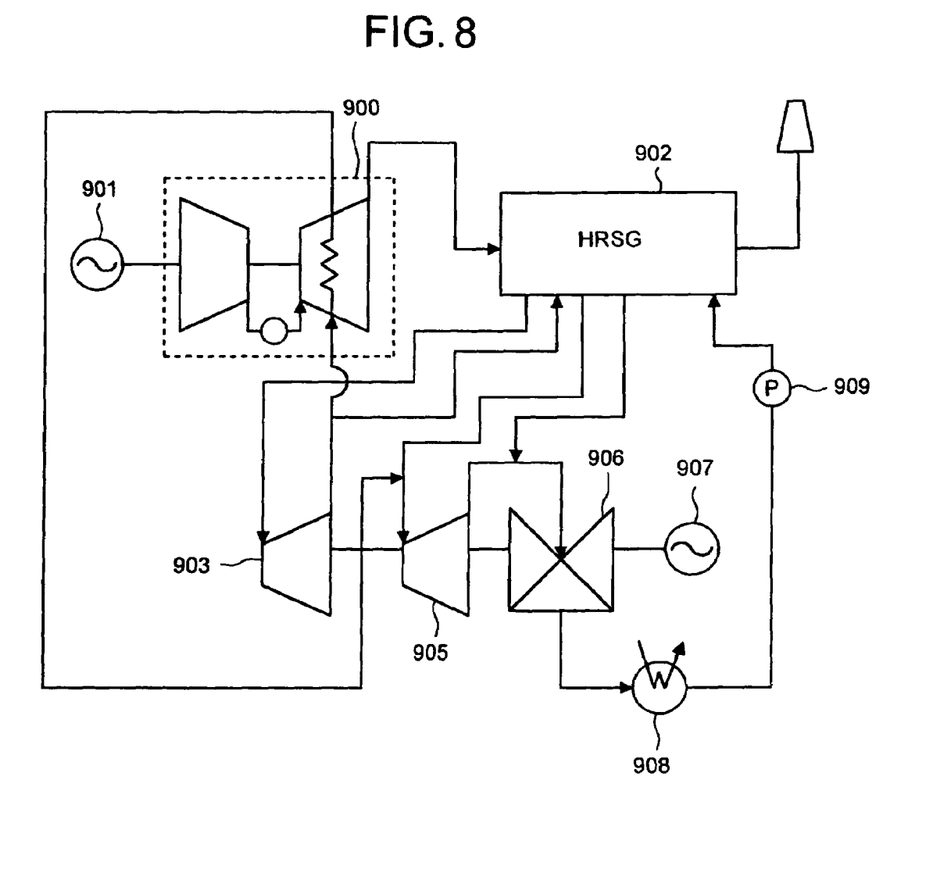
FIG. 8 is a schematic diagram that shows a vapor and gas turbine combined cycle power plant according to the present invention.

FIG. 8 is a schematic diagram that shows a vapor and gas turbine combined cycle power plant according to the present invention. In this vapor and gas turbine combined cycle power plant, thermal energy contained in the exhaust gas of the gas turbine is recovered by a heat recovery vapor generator (hereinafter HRSG). Steam is generated by the thermal energy in the recovered exhaust gas of the gas turbine, and a vapor turbine is driven by the high-temperature and high-pressure vapor, to thereby generate power by a generator connected thereto. In this manner, in the vapor and gas turbine combined cycle power plant, since exhaust heat of the gas turbine can be effectively used, the thermal efficiency of the whole plant can be increased.

Though details are omitted in FIG. 8, this gas turbine 900 uses vapor for cooling heating components, such as rotor and stator blades and rotor disks. Though details are omitted in FIG. 8, the turbine rotor explained in the first or the second embodiment is used. The gas turbine 900 is connected to a first generator 901, and the gas turbine 900 drives the first generator 901 to generate power. The exhaust gas of the gas turbine 900 has a temperature of about several hundred degrees, and hence this exhaust gas is guided to the HRSG 902, to generate vapor.

The vapor generated in the HRSG 902 is first guided to a high pressure vapor turbine 903, to drive this. The exhaust vapor of the high pressure vapor turbine 903 is guided to a reheater in an exhaust gas boiler, and a part thereof is guided to the gas turbine 900, and used for cooling heating components, such as the rotor blade and the stator blade. The vapor having cooled, the heating components in the gas turbine 900 is supplied to an intermediate pressure vapor turbine 905, together with the vapor superheated by the reheater in the exhaust gas boiler. The vapor having driven the intermediate pressure vapor turbine 905 is supplied to a low pressure vapor turbine 906 to drive this. The high pressure vapor turbine 903, the intermediate pressure vapor turbine 905, and the low pressure vapor turbine 906 are serially connected, to rotate a second generator 907 connected with the output shafts thereof, to thereby generate power.

The vapor having driven the intermediate pressure vapor turbine 905 and the low pressure vapor turbine 906 is recovered to a water form by a condenser 908, and then supplied again to the HRSG 902 by a pump 909. The water is turned into vapor again by an evaporator (not shown) provided in the HRSG 902, superheated again by a superheater (not shown), and then supplied to the high pressure vapor turbine 903 to repeat the above-described process.

In this vapor and gas turbine combined cycle power plant, the gas turbine 900 having the turbine rotor explained in the first embodiment or in the second embodiment is used. Therefore, even at the time of changing the refrigerant, the rotor disks can be quickly warmed up or cooled. As a result, since the time required for reaching the rated operation from the start-up of the gas turbine 900 can be reduced, to thereby reduce the starting loss. Further, since the temperature distribution in the rotor disks can be reduced, to reduce vibrations in the turbine rotor, tripping of the gas turbine can be suppressed. As a result, in this vapor and gas turbine combined cycle power plant, power can be supplied stably.

As explained above, the turbine rotor according to the present invention is constructed such that the refrigerant is made to flow from the through hole provided in the central portion of the rotor disk, radially outwards of the rotor disk. Therefore, in the space in the turbine rotor, convection of the refrigerant is promoted, and hence the rotor disk can be quickly warmed up. As a result, the time required for the rated operation of the gas turbine can be shortened, to reduce a starting loss. Since the convection of the refrigerant is promoted in the space to equalize the temperature distribution in the radial direction of the rotor disk, spindle vibrations can be suppressed, thereby enabling stable operation. Further, since a thermal stress resulting from a temperature difference between the outer circumference and the internal circumference of the rotor disk can be reduced, the burden on the rotor disk is reduced, thereby enabling extension of the life.

The turbine rotor according to the present invention is constructed such that, a rotor disk having a through hole, through which the refrigerant passes, provided in the central portion thereof is alternately arranged, in the rotor disks on and after the second stage. Therefore, the refrigerant flows in the space by alternately repeating the radially outward flow and radially inward flow, to promote the convection in all spaces. As a result, the radial temperature distribution in all rotor disks is reduced, thereby enabling stable operation. After finishing the warm-up, the temperature of the refrigerant rises gradually in the process of cooling the rotor disks, and hence it becomes easy to supply the refrigerant suitable for the temperature condition of each rotor disk. As a result, excessive thermal stress occurring in the rotor disk resulting from a temperature difference between the rotor disk and the refrigerant can be reduced. Further, since a thermal stress resulting from a temperature difference between the outer circumference and the internal circumference of the rotor disk can be also reduced, the burden on the rotor disk is reduced, thereby enabling extension of the life of the rotor disk.

The turbine rotor according to the present invention is constructed such that, through holes provided near the center of the rotor disks are arranged with a certain interval with respect to the circumferential direction of the rotor disk. As a result, the temperature in the circumferential direction of the rotor disk can be made uniform, to suppress vibrations, thereby enabling stable operation. Further, since a thermal stress occurring in the rotor disk can be further reduced, the burden on the rotor disk can be further reduced.

The turbine rotor according to the present invention has a configuration such that the refrigerant is supplied to the space formed between rotor disks by the refrigerant supply pipe. Therefore, pressure loss of the refrigerant can be reduced, and as a result, the refrigerant can be supplied efficiently. Since the refrigerant supply pipe is provided at the center of the rotor disk, the refrigerant can be supplied from the vicinity of the center of the rotor disk. As a result, since the radial temperature distribution can be made more uniform than in the above-described turbine rotor, vibrations can be suppressed, thereby enabling stable operation. Further, thermal stress occurring in the rotor disk can be further reduced and the burden on the rotor disk can be further reduced, thereby enabling extension of the life of the rotor disk.

Moreover, in the turbine rotor, a hole is provided on the side of the refrigerant supply pipe provided at the center of the rotor disk, so that the refrigerant is supplied from this hole to the space formed between the rotor disks. Therefore, the refrigerant is supplied from the vicinity of the center of the rotor disk, to decrease a temperature distribution in the radial direction of the rotor disk, thereby enabling stable operation. Since thermal stress occurring in the rotor disk can be further reduced, the burden on the rotor disk can be further reduced, thereby enabling extension of the life. Further, since the refrigerant is supplied by the refrigerant supply pipe, convection can be formed in the space efficiently, to raise the temperature in the turbine rotor quickly.

The gas turbine according to the present invention comprises a gas turbine having the turbine rotor, and can warm up the rotor disk quickly, when changing over the refrigerant. Therefore, particularly in the gas turbine using vapor cooling, the time required from the start-up to the rated operation can be shortened, thereby enabling reduction of a starting loss. Further, since vibrations of the turbine rotor can be reduced by decreasing a temperature distribution in the rotor disk, tripping of the gas turbine can be suppressed. As a result, when this gas turbine is applied to a power plant, power can be stably supplied.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

The invention claimed is:

1. A turbine rotor in a gas turbine, comprising:
   a plurality of stages of rotor disks; and
   a spindle coupled to the rotor disks by a plurality of spindle bolts,
   wherein a space is provided between the rotor disks and inside the spindle into which a refrigerant is circulated, and at least one through hole that is substantially parallel to the spindle bolts and through which the refrigerant can pass is provided only in every alternate stage of said plurality of stages of rotor disks after a first stage.

2. The turbine rotor according to claim 1, wherein the at least one through hole is provided at substantially a center of the rotor disk.

3. The turbine rotor according to claim 1, wherein the refrigerant comprises vapor.

4. A gas turbine comprising:
a compressor that intakes air and compresses the air to produce combustion air;
a combustor that intakes a fuel and the combustion air and mixes the fuel and the combustion air to produce a combustion gas; and
a turbine having a turbine rotor, the turbine rotor having:
a plurality of stages of rotor disks; and
a spindle coupled to the rotor disks by a plurality of spindle bolts,
wherein a space is provided between the rotor disks and inside the spindle into which a refrigerant is circulated, and at least one through hole that is substantially parallel to the spindle bolts and through which the refrigerant can pass is provided only in every alternate stage of said plurality of stages of rotor disks after a first stage.

5. The gas turbine according to claim 4, wherein the refrigerant comprises vapor.

* * * * *